Sept. 23, 1958 P. B. BRYK ET AL 2,853,361
METHOD FOR OBTAINING INTIMATE CONTACT BETWEEN
FINELY DIVIDED SUBSTANCES AND GASES
Filed July 30, 1953 4 Sheets-Sheet 1

PETRI B. BRYK and
JORMA B. HONKASALA
INVENTORS.

BY *Albert M. Parker*

ATTORNEY.

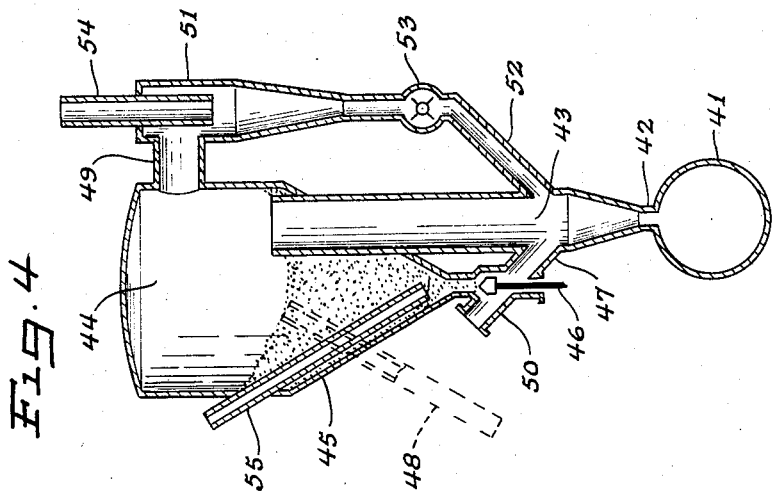
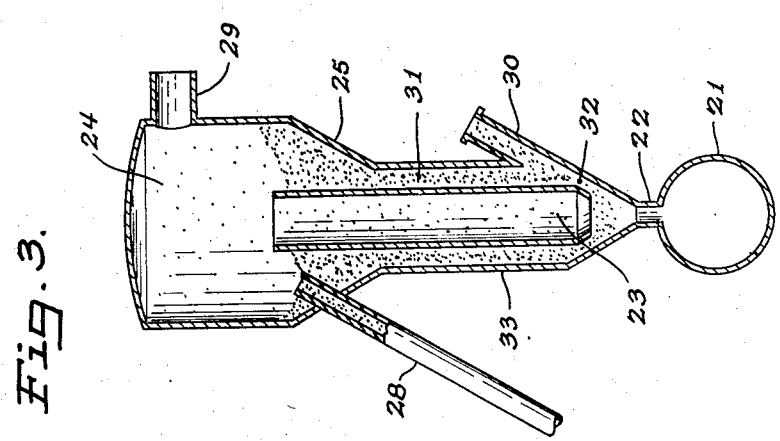

PETRI B. BRYK and
JORMA B. HONKASALA
INVENTORS.

PETRI B. BRYK and
JORMA B. HONKASALA
INVENTORS.

ATTORNEY.

United States Patent Office 2,853,361
Patented Sept. 23, 1958

2,853,361

METHOD FOR OBTAINING INTIMATE CONTACT BETWEEN FINELY DIVIDED SUBSTANCES AND GASES

Petri B. Bryk, Helsinki, and Jorma B. Honkasalo, Pori, Finland

Application July 30, 1953, Serial No. 371,250

1 Claim. (Cl. 23—1)

This invention relates to a method for obtaining intimate contact between finely divided substances and gases. It is more particularly concerned with the obtaining of such contact for the carrying out of chemical reactions such as oxidation, reduction, chlorination, sulphatizing, etc., as well as for obtaining reactions between gaseous components when finely divided substances are used as catalysts.

The invention is also particularly concerned with and is applicable to the obtaining of physical reactions, such as volatilization, exchange of heat between finely divided material and gas, or for simultaneously occurring chemical and physical reactions, such as the obtaining of chemical products and the simultaneous volatilization of them. Other treatments, chemical, physical and mixed, to which the invention is applicable will readily suggest themselves to those skilled in the art.

Methods are known according to which a stream of gas is led through a chamber containing the solid particles for putting them into contact with the gas in the so called fluidized state. Alternatively, methods are known in which a gas stream picks up and carries particles and wherein the coarser of the particles are separated from the gas stream by traps, baffles, or other means for effecting changes in the direction of the gas flow; the separated particles thereafter being reintroduced into the reaction chamber for a subsequent treatment.

According to the instant invention, finely divided particles are put into contact with an upwardly directed gas stream at the bottom of a horizontally restricted, vertically elongated path, the velocity of the gas stream being high enough for the gas to pick up and carry on particles to a height which is dependent upon the reaction effect desired in this real reaction zone. At the height of such path its horizontal cross-sectional area is enlarged for diminishing the velocity of the gas stream to such a degree that the gas will no longer be able to carry at least part, if not all, of such particles. Consequently, part, or all, of the particles will be separated from the gas stream settling out from it. They may then be removed from the path and if desired be reintroduced for new treatment at the lower end of the path.

For the separation of such particles which do not settle out merely by the reduction in velocity, but instead continue to follow the gas stream as the same leaves the enlarged upper part of the path, cyclone separators, electric precipitators or other known and suitable apparatus may be employed. These latter particles also after separation may, if desired, be reintroduced at the lower end of the original gas path, or of a new path. Moreover, two or more paths may be connected in a series and new material may be introduced into one or more of these paths.

In some instances, the gas may be reused by reintroducing it at the lower end of one of the paths. If the gas leaving the path contains condensable components which it is desired, or is necessary, to remove from the gas, that may be done by reducing the temperature of the gas by means of suitable equipment.

The method according to the invention may be carried out either intermittently, or continuously. When the method is carried out on an intermittent basis, the particles may be removed after a single treatment, or the treatment may be repeated until the desired physical condition, or chemical results, are reached. Thereafter, the treated particles are removed and a new amount, or batch, of material is introduced for repeating the process. In a continuous process, the whole batch of particles is not removed. On the contrary, a pre-determined amount of new material is continuously charged into one, or more, of the paths, while a corresponding amount of treated material is simultaneously withdrawn from one of the paths.

For example, if the contact time between the particles and gas during their vertical path of movement is one second, and if it is known that the required time for the desired reaction is one hundred seconds, then the treatment may be carried out in such a manner that the amount of recirculated material is one hundred times greater than the amount of new feed. Accordingly, the particles will be put into contact with and be carried by the gas on the average of one hundred times. Consequently, the contact time will be the required time of one hundred seconds.

Material in finely divided form usually consists of varying grain sizes and in most cases the coarser grains demand a longer time of reaction than the smaller ones. The instant invention makes it possible to obtain a classification of the particles separating from the gas, the different grain classes being recirculated, the time of recirculation of each class being dependent on the contact time required. Thus, coarser grains are recirculated for a longer time, while the finest grains are limited to a short time for circulation.

The invention also renders it possible to control at will the contact time between particles and gas. Normally, the gas would flow only once through the path, which in most instances may result in the contact time of the gases, particularly that of the active component of them, with the particles, being too short. One way of effecting complete reaction here is to recirculate the gas, but normally it is more advantageous to do so—not by recirculation—but by dividing the treatment into steps, with each step or phase having its own gas path for treatment and separation of particles, whence the particles coming from one phase are introduced into a second, and from this eventually into a third, etc. The gas may be led from one phase to another, either concurrently together with the particles, or in opposite direction to the flow of the particles. The latter contracurrent flow method is provided in most cases because it offers better possibilities for the completion of reactions. In this latter case the particles will meet the gas in the contracurrent flow wherein the particles which have remained in the system for the longest time, thus being in the last phase, will meet incoming unreacted gas. Subsequently, the more or less reacted gas will meet more or less freshly charged material, with the most reacted gas meeting the freshest of the material before the gas is allowed to leave the process.

The possibilities for reaction in such multiple contracurrent flow system produce superior results to the situation where only one step, or phase, is involved. This is true even in the simple application of the invention for heat exchange between finely divided particles and hot gas. Here, a much better heat balance is obtained when operating in a multiple phase contracurrent flow than is the case when only one phase is involved.

It is accordingly the principle object of the invention to improve upon methods and apparatus for putting finely divided particles into contact with gas.

Another object is to increase the effectiveness of such method and apparatus.

Still another object is to provide more effective separation of finely divided particles and gases which have been put into contact for treatment.

A further object is to provide a method for bringing gases and finely divided particles together for treatment in a manner that may be carried out continuously, or intermittently.

Still further objects are to provide for the classification of particles separated from a gas after they have been brought together for treatment; to control the contact time between such particles and gas; and to provide for either concurrent or contracurrent flow of gases and particles being brought together for treatment.

Further and more detailed objects of the invention will in part be obvious and in part be pointed out as the description of the invention taken in conjunction with the accompanying drawing proceeds.

In that drawing:

Figure 3 is a similar view of another modification.

Figure 4 is a similar view of a further modification including a separator.

Figure 5 is a vertical section of apparatus similar to that of Figure 1 in combination with separating and classifying apparatus capable of reintroducing the particles classified, if desired, while

Figure 2:
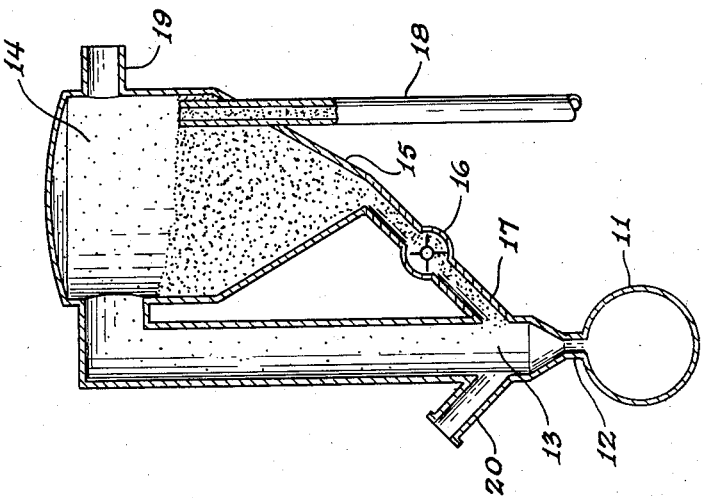
Figure 2 is a similar view of a modified form of apparatus for carrying out the method of the invention.

In the embodiments illustrated in the drawing, it is to be understood that a portion or all of the particles can be recirculated to the reaction compartment, such being the various gas paths. It is also evident that the particles can be removed from the apparatus when treatment is completed. A plurality of the apparatus can, if desired, be connected in series, or parallel, being placed side by side on the same level, or superimposed one above the other. The product can be removed from the last phase, or partially from an earlier phase. Different gas additions can be used in any phase and new components can be added to the solids between the different steps.

Though the basic features of the various forms of apparatus shown are substantially the same, the structural differences are such that it has been necessary to apply different reference characters to the parts which are generally similar from figure to figure. To relate similar parts together, however, the attempts has been made to employ series of reference characters in sets of tens.

Figure 1:
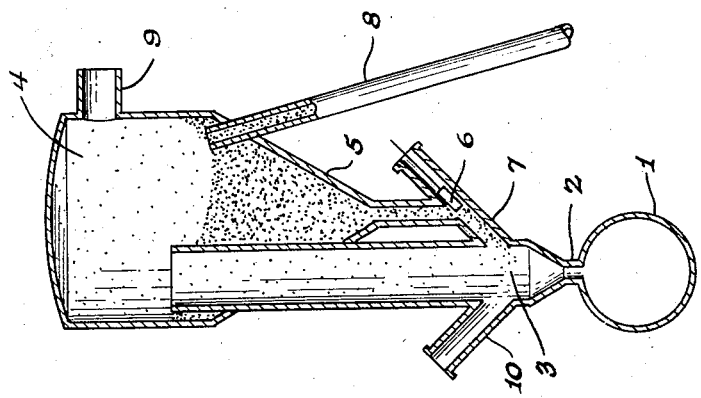
Figure 1 is a vertical section of one form of apparatus in accordance with the invention and for carrying out the method of the invention.

In Figure 1 the incoming gas duct is shown at 1, while 2 is the restricted inlet through which the gas is led upwardly to the vertical contact compartment 3. Fresh particles to be treated by the gas, or to act on the gas, are introduced to the lower part of the compartment 3 through the duct 10 by means of known suitable feeding and transporting devices not here shown. The extent of the contact or treatment compartment 3 and the relationship of it to the other parts of the apparatus illustrated are important features of the invention. As will be seen by reference to the drawing, the treatment compartment 3 provides a uniform unobstructed passage of pre-selected height or length for the coaction of the gases and particles from the position where they are brought together at the lower end of the treatment compartment. The length and cross-sectional area of the treatment compartment are related to such factors as the gas velocity, the size and density of the particles, the rate at which the particles are to be introduced and whether the treatment is to be completed in one pass of the gas, or particles, as the case may be. In any event, the compartment 3 is to be of substantial extent vertically, as against its cross-sectional area. Of course, if the treatment is of a one-stage nature, it should be completed, or substantially completed, as the gas and particles emerge from the upper end of the treatment compartment 3.

The upper end of the treatment compartment 3 opens out into an enlarged compartment 4 of substantially greater cross-sectional area than that of the compartment 3. Thus, the velocity of the gas stream is reduced to such an extent that all, or at least the desired portion, of the particles formerly carried by the gas through the compartment 3 settle and are collected in the lower portion 5 of the separation compartment 4. Recirculation of these separated particles as desired is effected by means of feeder 6 through the pipe 7 which opens out into the lower part of the treatment compartment 3. Should it be desired, however, that the separated particles be subjected to some other treatment after they have been removed from the gas stream, they can be led off at the position 6, or at some other position with regard to the supply of them in the portion 5 of the compartment 4. Then after treatment they can be reintroduced into the gas path by some means such as the pipe 7.

Particles which have already circulated the desired number of times may be removed through the outflow pipe 8. Treated gases leave the upper part of the separation compartment 4 through the pipe 9 and may, if desired (such as after regeneration), be reintroduced into the duct 1 and thus back into the system. When this form of apparatus is employed for continuous treatment the amount of new particles introduced through the duct 10 into the treatment compartment 3 should correspond to the total amount of material removed by the pipe 8, in addition to the amount of particles carried out by the gases through the outlet 9.

The actual form, or shape, of related parts, such as the lower part of the compartment 4, the pipe 7, the neck 2, etc., are of course selected in the interests of effective operation and are sufficiently shown in the drawing. Nothing further need be said about them here.

In the alternative arrangement shown in Figure 2, the gas duct 11 communicates through a restricted inlet 12 into the treatment compartment 13. Here, the treatment compartment is located entirely outside of the separation compartment 14 and enters into the upper part thereof through a side wall opening. The treatment compartment 13, here illustrated, is even of greater vertical extent than that shown in Figure 1.

Again, the particles which settle and are collected in the cone shaped lower portion 15 of the separation compartment 14 can be fed back under control of the valve 16 through the pipe 17 into the lower part of the treatment compartment 13. Removal of particles which have circulated the desired number of times is effected through the pipe 18 and treated gases leave through the pipe 19, as from the pipe 9 of the Figure 1 form. Again, also, new particles are introduced through the duct 20 comparable to the duct 10 of Figure 1. This form of the apparatus may also be operated on a continuous treatment basis.

In Figure 3, the gas duct 21 admits gas through the inlet 22 into the treatment compartment 23 which, in this instance, is arranged concentrically with respect to the separation compartment 24. The upper portion of the compartment 24 is, however, similar to the upper portion of the compartment 4, and has a duct 29 like the duct 9 for conducting treated gases therefrom. The cone shaped lower portion of the compartment 23 constricts at 25 to collect the particles, but does so in the form of a downwardly extending elongation 33 concentric with the treatment compartment 23 through which the particles 31 pass down to an annular zone 32 where the downward path is again restricted to emit the particles opposite the end of the treatment compartment 23. Thus, these recirculating particles, admitted if desired through the conduit 30, are picked up by the gas and carried up through the treatment compartment 23.

Again, once the gas with its particles emerges from the upper end of the treatment compartment 23 it expands into a greater volume, loses its velocity and drops the desired amount of the particles carried by it. The particles already circulated the desired number of times are removed through the outflow pipe 28.

In the Figure 4 form, the construction reverts to one in which the treatment compartment extends into the separation compartment eccentrically with respect to the same. Here, however, a cyclone separator is added and other changes are made in the construction. As seen from the drawing, where a cyclone separator is used and the reintroduction of particles is effected from the separator, the compartment 44 and its reduced lower portion 45 can be considerably smaller than their counterparts 4 and 5 in Figure 1.

In the Figure 4 form, gas from the conduit 41 is admitted through the orifice 42 into the treatment compartment 43. Particles are admitted into the lower portion of that compartment through the pipe 47 under the control of the valve 46. These particles are ready to recirculate after settling out into the lower portion 45 of the separation compartment 44. As the gas leaves the upper portion of the treatment compartment 43 and expands into the separation compartment 44 it will leave certain of its particles to settle down into the portion 45 of the separation compartment, but will carry some of them off through the pipe 49 into the cyclone separator 51. There, gas and particles are further separated and the particles separated out here will pass down under control of the valve 53 through the pipe 52 to be reintroduced adjacent the bottom of the treatment compartment 43. Any further particles carried off by the gas through the pipe 54 may be separated elsewhere by suitable means and reintroduced through the pipe 55 into the lower portion of the separation compartment 45. Finally, any new particles to be introduced can be brought in through the extending portion 50 of the pipe 47.

Here the pipe 48 for the removal of used up particles, comparable to the pipe 8 of Figure 1, has been shown in dotted lines. The purpose of this is to indicate that this pipe may be closed off, or eliminated entirely, if the apparatus is to be used for batch process operation for which it is well suited. In such operation the initial particles are reused, which provides for a long contact time.

Figure 5:
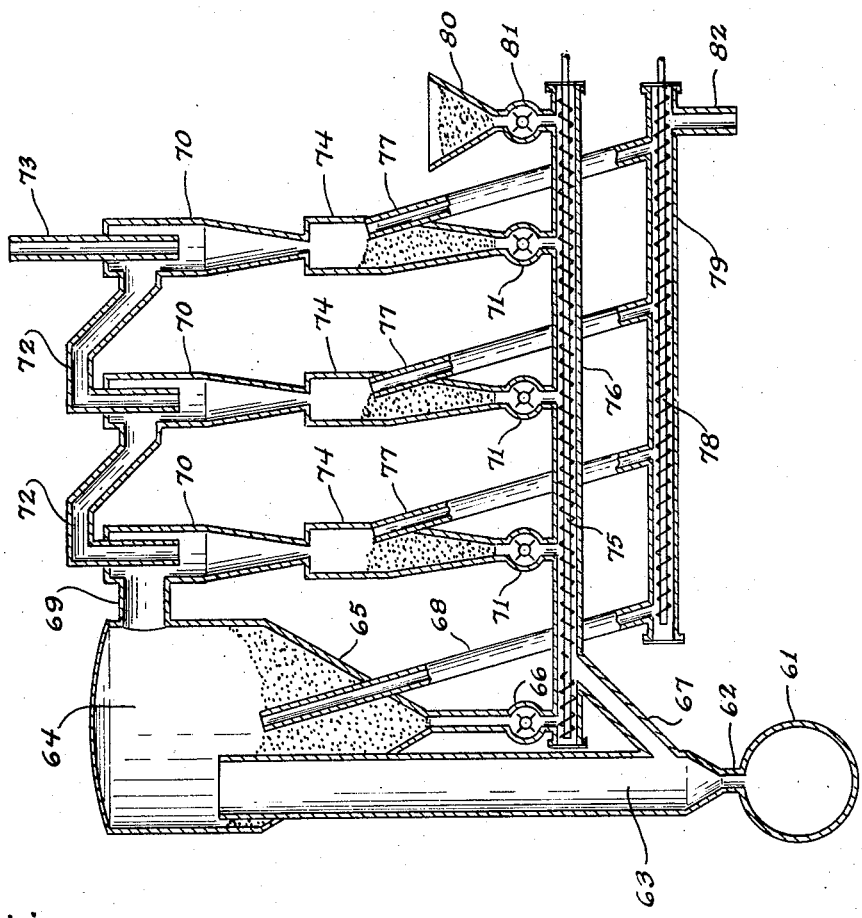

In the Figure 5 form, gas from the conduit 61 passes up through the orifice 62, picks up particles from the pipe 67 at the lower end of the treatment compartment 63 and discharges at the upper end of the compartment 63 into the separation compartment 64 where some of the particles are separated out and collected in the lower portion 65 of the compartment 64. From there their passage back into the system is controlled by a suitable valve 66.

The gas leaving the compartment 64 by means of the outlet 69 is, in this instance, passed through a bank of cyclones connected and operating in series. These serve for the separation and classification of the particles to be reintroduced into the treatment chamber, or removed from the apparatus, as the case may be. Each of the cyclones is equipped with a bin and their construction and operation is sufficiently identical that the same reference characters have been applied to each. Thus, a description of one will serve for a description of all.

The conduit 69 extends into a cyclone housing 70 from which a pipe 72 extends upward and across into the next cyclone. The housing 70 communicates at its lower end with a bin 74 receiving the particles separated out at this stage of separation. The particles from the bin 74 may either be drawn off from the system through the pipe 77, or may be led back into the system by means of the valve 71 at the lower end of the bin 74. Through the valve 71 the bin 74 communicates with a feed tube 76 equipped with a screw conveyor 75 for feeding particles to the left in Figure 5 and thus to the pipe 67. The portion of this screw conveyor at the left end beneath the valve 66 serves in reverse to return material from the lower portion 65 of the separating compartment back into the treatment compartment through the pipe 67. Particles to be drawn off through the pipe 68, as well as through the pipes 77 from the bins of each of the cyclone separators, communicate with another conveyor tube 79 also equipped with a screw conveyor for conducting particles to the right in Figure 5 and exhausting them through the pipe 82.

The cyclone separator furtherest to the right in Figure 5, being the one at the end of the series, has a gas outflow pipe 73 from which gas and any particles remaining therein may be drawn off and disposed of in desired manner.

A hopper 80 for the reception of new particles, or material from some other step of the process, is located at the righthand end of the conveyor tube 76. From this hopper such material may be introduced into the conveyor tube 76 under the control of the valve 81 and may thus be transported by means of the screw to the inlet pipe 67.

Figure 6:
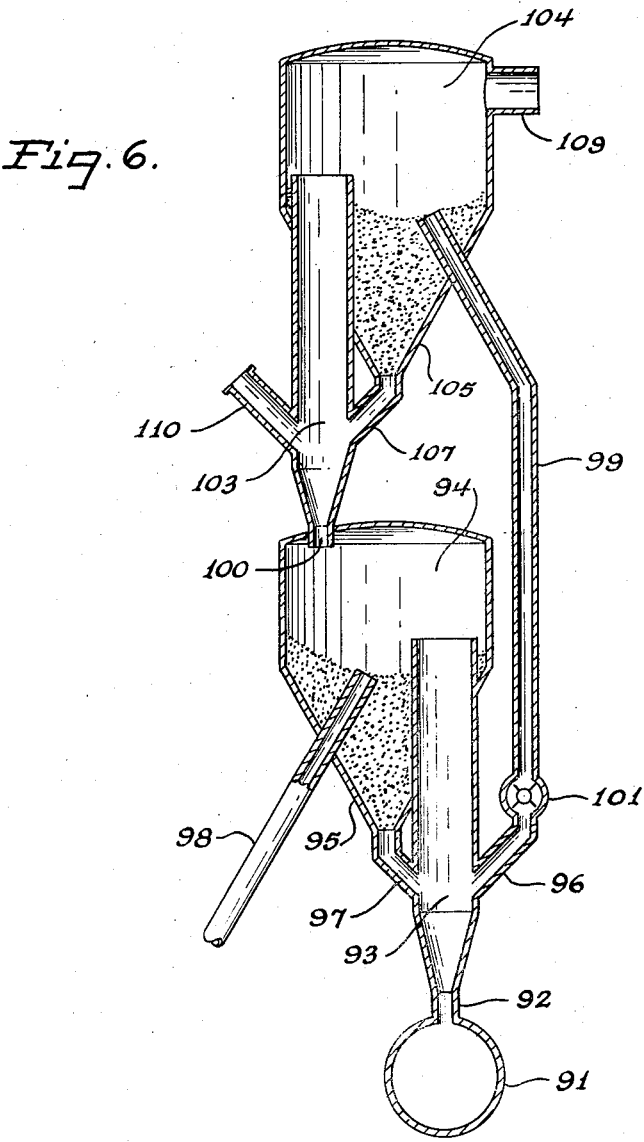
Figure 6 is a vertical section of two forms of apparatus, similar to that shown in Figure 1, joined together in series and capable of counter-flow action.

Two complete treatment and separation units of the type heretofore considered are shown combined in series in Figure 6. Obviously, the superimposed relationship of the units here could be changed to a side by side relationship without destroying the principle of operation. Also, it is apparent that a certain countercurrent flow relationship exists here.

In this instance, gas from the conduit 91 is introduced at 92 and picks up particles from either the lower portion 95 of the separation compartment 94, or from the pipe 96 as desired. As the gas and particles emerge from the upper end of the treatment compartment 93 into the separation compartment 94 certain of the particles may be drawn off through the pipe 98 in the manner already described.

The gas in the compartment 94 passes upwardly therefrom through the opening 100 into the next treatment compartment 103 at the lower end of which it may pick up already treated particles from the lower portion 105 of the separation compartment 104 through the pipe 107, or it may receive new particles introduced through the pipe 110. On separation of the emergent particles from the gas in the compartment 104, certain of them are taken out through the outflow pipe 99 and, as already indicated, are reintroduced under the control of the valve 101 through the pipe 96 into the lower end of the treatment compartment of the lower unit. That treatment compartment 93 may also receive particles through the pipe 97. Here, then, the counterflow aspect is provided for by the new gas first engaging used particles while the partly treated gas passing out through the orifice 100 may meet entirely fresh particles entering through the conduit 110, or particles which have merely gone through one stage and are collected in the lower portion 105 of the separation compartment. Gas having passed through both stages of treatment is let off through the outlet pipe 109 from the upper separation compartment 104.

Specific pieces of apparatus, such as introducing means, electric precipitators, etc., known to those skilled in the art have been omitted from the showing of the drawing for the sake of clarity.

It will be apparent to those skilled in the art that certain changes may be made in carrying out the above process and in the construction set forth which embodies the invention without departing from the scope of the invention. It is accordingly intended that all matter contained in the above description or shown in the accompanying drawing shall be interpreted as illustrative and not in a limiting sense.

The invention claimed is:

A method for treating finely divided particles with a gas which comprises performing a series of operations in sequence, each of which operations includes, forming a vertically extending horizontally restricted substantially unobstructed suspension zone, introducing gas under pressure through a restricted orifice into such zone, allowing said gas to decrease in velocity in said zone, introducing said particles into said gas to form a suspension after the velocity of said gas has materially decreased to carry said particles upwardly with it and past the end of said zone, substantially completing such treatment during the passage through said zone, and terminating said treatment as most of said particles are separated from said gas at the end of said zone by emitting said gas and particles carried thereby into another zone of greater cross section than said restricted zone, thereby further reducing the velocity of said gas and removing said particles from the path of said gas, the solid particles in said zone of enlarged cross section being collected in a gravitating, compact bed in the absence of a fluidizing medium, employing said gas, after most of the particles have been separated therefrom in one of said operations as the treating gas for a subsequent one of said series of operations and introducing particles from said bed of a subsequent one of said operations into said restricted zone of said one operation adjacent the lower end thereof.

References Cited in the file of this patent

UNITED STATES PATENTS

| | | |
|---|---|---|
| 2,337,684 | Scheineman | Dec. 8, 1943 |
| 2,231,424 | Huppke | Feb. 11, 1944 |
| 2,364,145 | Huppke | Dec. 5, 1944 |
| 2,582,710 | Martin | Jan. 15, 1952 |
| 2,582,711 | Nelson | Jan. 15, 1952 |
| 2,582,712 | Howard | Jan. 15, 1952 |